(12) United States Patent
Awad Alla et al.

(10) Patent No.: US 11,745,593 B1
(45) Date of Patent: Sep. 5, 2023

(54) TESTING OF VEHICLE BATTERIES

(71) Applicant: Ford Global Technologies, LLC, Dearborn, MI (US)

(72) Inventors: Michael Adel Awad Alla, Novi, MI (US); Sami Dagher, Dearborn, MI (US); Mathew A. Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/745,918

(22) Filed: May 17, 2022

(51) Int. Cl.
| | | |
|---|---|---|
| *B60L 3/00* | (2019.01) | |
| *B60L 3/04* | (2006.01) | |
| *H02J 7/00* | (2006.01) | |
| *H02J 7/34* | (2006.01) | |
| *B60L 50/60* | (2019.01) | |

(52) U.S. Cl.
CPC .......... *B60L 3/0069* (2013.01); *B60L 3/0084* (2013.01); *B60L 3/04* (2013.01); *B60L 50/66* (2019.02); *H02J 7/0068* (2013.01); *H02J 7/342* (2020.01); *H02J 2310/48* (2020.01)

(58) Field of Classification Search
CPC ...... B60L 3/0069; B60L 50/66; B60L 3/0084; B60L 3/04; H02J 7/342; H02J 7/0068; H02J 2310/48
See application file for complete search history.

(56) References Cited

U.S. PATENT DOCUMENTS

| | | | |
|---|---|---|---|
| 9,649,939 B2 | 5/2017 | Bissontz | |
| 2019/0152332 A1* | 5/2019 | Bertness | B60L 50/64 |
| 2019/0210473 A1* | 7/2019 | Linehan | B60L 1/00 |
| 2020/0111272 A1* | 4/2020 | Ferre Fabregas | G05B 23/0283 |
| 2021/0276425 A1 | 9/2021 | Gauthier et al. | |
| 2022/0266779 A1* | 8/2022 | Yamada | B60R 16/033 |

FOREIGN PATENT DOCUMENTS

CN  110979012 A  4/2020

* cited by examiner

*Primary Examiner* — Jared Fureman
*Assistant Examiner* — Duc M Pham
(74) *Attorney, Agent, or Firm* — Frank A. MacKenzie; Bejin Bieneman PLC (57) ABSTRACT

A vehicle electrical system for a vehicle includes a power source, two low-voltage buses, two power-distribution boxes each electrically connected to the power source and to one of the low-voltage buses and positioned to control electrical flow from the power source to that low-voltage bus, and two low-voltage batteries each electrically connected to one of the power-distribution boxes and arranged to supply electricity to one of the low-voltage buses via that power-distribution box. Each power-distribution box is programmed to perform a test on its low-voltage battery, the tests being isolated from the other low-voltage battery.

20 Claims, 5 Drawing Sheets

TESTING OF VEHICLE BATTERIES

BACKGROUND

Vehicles can include propulsion systems to use stored energy and translate the energy into motion of the vehicle. Types of propulsions include a conventional powertrain including an internal-combustion engine coupled to a transmission that transfers rotational motion to wheels; an electric powertrain including high-voltage batteries, an electric motor, and a transmission that transfers rotational motion to the wheels; and a hybrid powertrain including elements of the conventional powertrain and the electric powertrain. Vehicles of any propulsion type typically also include low-voltage batteries.

In normal operation, electrical loads are typically powered by the engine and/or the high-voltage batteries without drawing power from the low-voltage batteries. The low-voltage batteries supply power in the event of transient demands from the loads for greater power than the engine and/or high-voltage batteries can supply. Occasionally electrical faults such as short circuits can occur, which can increase demand on the low-voltage batteries.

DETAILED DESCRIPTION

This application pertains to a vehicle electrical system with increased reliability. The vehicle electrical system can include multiple buses for distributing power from a power source such as a high-voltage battery to loads on the buses. Loads on one bus can be backups of loads on another bus. Each bus can have a respective power-distribution box and a respective low-voltage battery. Each power-distribution box can route electricity to the loads on that bus. The low-voltage batteries can power the loads for a period of time when the power source is off or disconnected. Tests can be performed on the low-voltage batteries to check whether the low-voltage batteries are capable of powering the loads, e.g., discharge tests. The programming for the tests can be located in the power-distribution boxes rather than in a control module that is in communication with the buses, and the tests can be isolated to the relevant bus. Separation can prevent a fault on one bus from affecting another bus and can prevent an issue with the vehicle's communication network from affecting the test. Each power-distribution box can perform its test so long as its bus has power, meaning that the tests are not dependent on any other bus having power. The system thus has high reliability. The system provides these benefits while keeping the complexity of the system's architecture low, further helping reliability.

A vehicle electrical system for a vehicle includes a power source, a first low-voltage bus, a first power-distribution box electrically connected to the power source and to the first low-voltage bus and positioned to control electrical flow from the power source to the first low-voltage bus, a first low-voltage battery electrically connected to the first power-distribution box and arranged to supply electricity to the first low-voltage bus via the first power-distribution box, a second low-voltage bus, a second power-distribution box electrically connected to the power source and to the second low-voltage bus and positioned to control electrical flow from the power source to the second low-voltage bus, and a second low-voltage battery electrically connected to the second power-distribution box and arranged to supply electricity to the second low-voltage bus via the second power-distribution box. The first power-distribution box is programmed to perform a first test on the first low-voltage battery, and the first test is isolated from the second low-voltage battery. The second power-distribution box is programmed to perform a second test on the second low-voltage battery, and the second test is isolated from the first low-voltage battery.

The vehicle electrical system may further include a gateway module, and the first power-distribution box may be communicatively coupled to the second power-distribution box via the gateway module.

The power source may be a high-voltage battery. The vehicle electrical system may further include a first DC/DC converter electrically connecting the high-voltage battery and the first power-distribution box and a second DC/DC converter electrically connecting the high-voltage battery and the second power-distribution box.

The vehicle electrical system may further include a first control module electrically connected to the first low-voltage bus and arranged to receive electricity from the first low-voltage bus and a second control module electrically connected to the second low-voltage bus and arranged to receive electricity from the second low-voltage bus, and the first control module is programmed to instruct a component of the vehicle to actuate, and the second control module may be programmed to, in response to the first control module being inoperable, instruct the component to actuate. The component may include at least one of a steering system and a brake system.

Actuating the component may include autonomously operating the vehicle.

The first power-distribution box may be programmed to perform the first test while the vehicle is movably operating. The second power-distribution box may be programmed to perform the second test while the vehicle is movably operating and without overlapping the first test.

The first power-distribution box may be programmed to perform the first test in response to the vehicle starting. The second power-distribution box may be programmed to perform the second test in response to the vehicle starting such that the second test overlaps the first test.

Performing the first test may include causing the first low-voltage battery to discharge to supply electricity to first loads on the first low-voltage bus, and performing the second test may include causing the second low-voltage battery to discharge to supply electricity to second loads on the second low-voltage bus. A first discharge by the first low-voltage battery during the first test may be greater than a charge necessary to perform a minimal risk maneuver, and a second discharge by the second low-voltage battery during the second test may be greater than the charge necessary to perform the minimal risk maneuver.

The first power-distribution box may be programmed to, in response to an electrical quantity of the vehicle electrical system being outside an electrical-quantity range while performing the first test, transmit an instruction to perform a minimal risk maneuver or prevent the vehicle from movably operating. The vehicle electrical system may further include a first control module electrically connected to the first low-voltage bus and arranged to receive electricity from the first low-voltage bus and a second control module electrically connected to the second low-voltage bus and arranged to receive electricity from the second low-voltage bus, and the second control module may be programmed to, upon receiving the instruction from the first power-distribution box, perform the minimal risk maneuver.

The instruction may be a first instruction, and the second power-distribution box may be programmed to, in response to the electrical quantity of the vehicle electrical system being outside the electrical-quantity range while performing the second test, transmit a second instruction to perform the minimal risk maneuver or prevent the vehicle from movably operating. The vehicle electrical system may further include a first control module electrically connected to the first low-voltage bus and arranged to receive electricity from the first low-voltage bus and a second control module electrically connected to the second low-voltage bus and arranged to receive electricity from the second low-voltage bus, and the first control module may be programmed to, upon receiving the second instruction from the second power-distribution box, perform the minimal risk maneuver. The second control module may be programmed to, upon receiving the instruction from the first power-distribution box, perform the minimal risk maneuver.

The vehicle electrical system may further include a third low-voltage bus, a third power-distribution box electrically connected to the power source and to the third low-voltage bus and positioned to control electrical flow from the power source to the third low-voltage bus, and a third low-voltage battery electrically connected to the third power-distribution box and arranged to supply electricity to the third low-voltage bus via the third power-distribution box, and the first test and the second test may be isolated from the third low-voltage battery. The vehicle electrical system may further include a load electrically connected to the third low-voltage bus and arranged to receive electricity from the third low-voltage bus, and the load may include an accessories control module.

Figure 3:
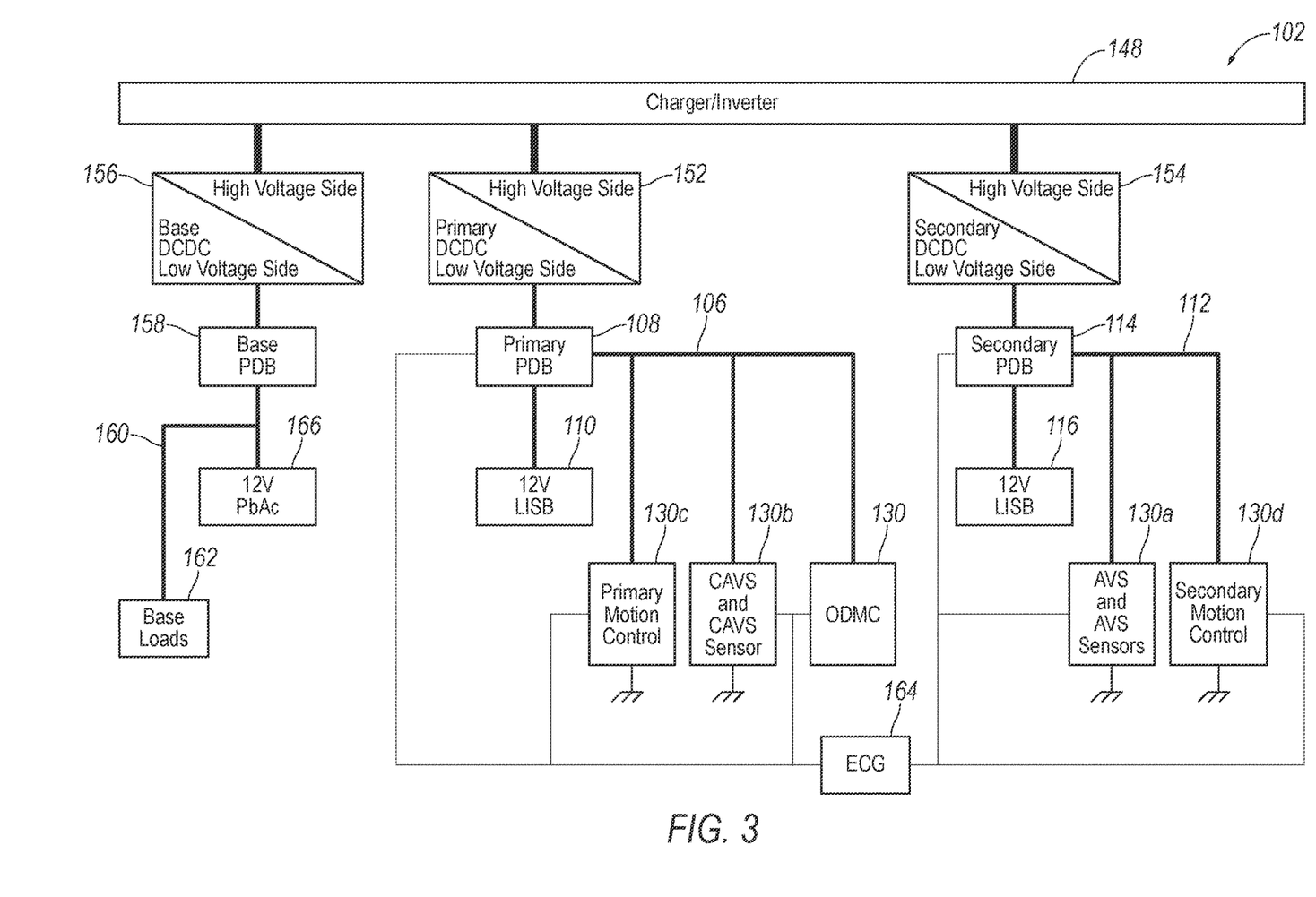
FIG. 3 is a block diagram of an electrical system of the vehicle.

With reference to the Figures, wherein like numerals indicate like parts throughout the several views, a vehicle electrical system 102 for a vehicle 100 includes a power source 104, a first low-voltage bus 106, a first power-distribution box 108 electrically connected to the power source 104 and to the first low-voltage bus 106 and positioned to control electrical flow from the power source 104 to the first low-voltage bus 106, a first low-voltage battery 110 electrically connected to the first power-distribution box 108 and arranged to supply electricity to the first low-voltage bus 106 via the first power-distribution box 108, a second low-voltage bus 112, a second power-distribution box 114 electrically connected to the power source 104 and to the second low-voltage bus 112 and positioned to control electrical flow from the power source 104 to the second low-voltage bus 112, and a second low-voltage battery 116 electrically connected to the second power-distribution box 114 and arranged to supply electricity to the second low-voltage bus 112 via the second power-distribution box 114.

The first power-distribution box 108 is programmed to perform a first test on the first low-voltage battery 110, the first test being isolated from the second low-voltage battery 116. The second power-distribution box 114 is programmed to perform a second test on the second low-voltage battery 116, the second test being isolated from the first low-voltage battery 110.

Figure 1:
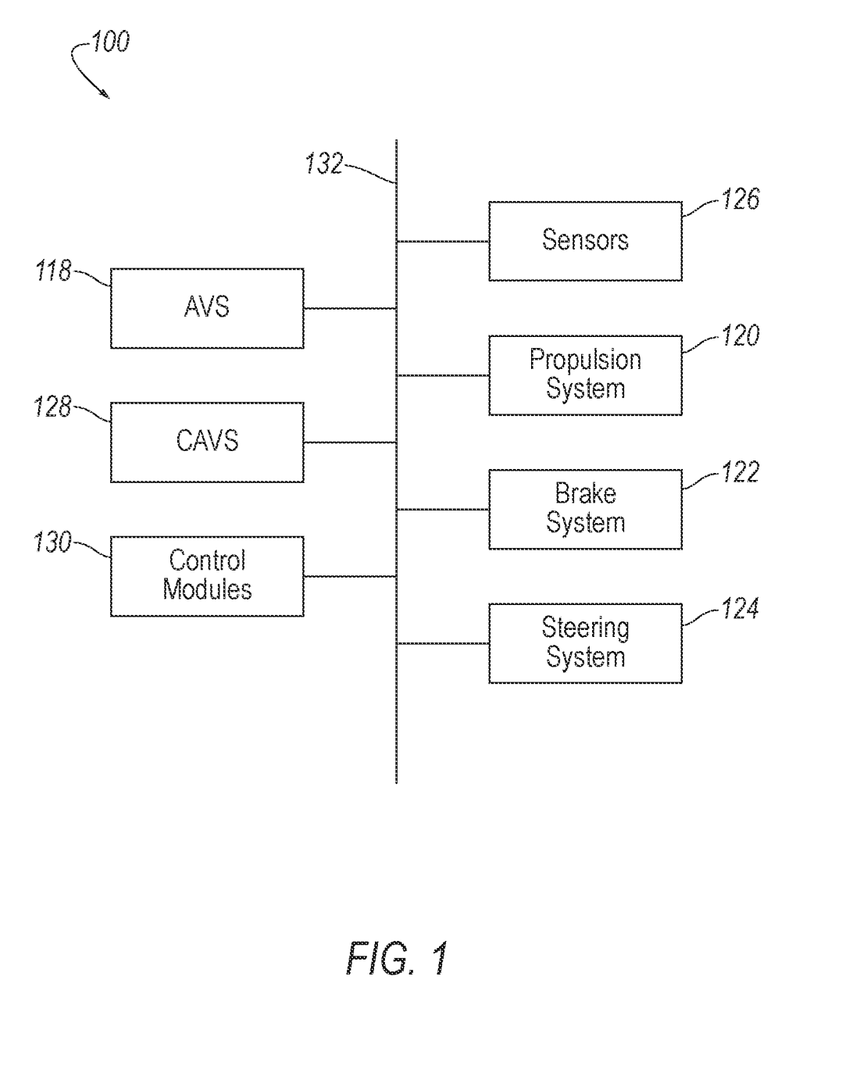
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. An autonomous-vehicle controller 118 can be programmed to operate the vehicle 100 independently of the intervention of a human operator, completely or to a lesser degree. The autonomous-vehicle controller 118 may be programmed to operate a propulsion system 120, a brake system 122, a steering system 124, and/or other vehicle systems based on data received from sensors 126. For the purposes of this disclosure, autonomous operation means the autonomous-vehicle controller 118 controls the propulsion system 120, brake system 122, and steering system 124 without input from a human operator; semi-autonomous operation means the autonomous-vehicle controller 118 controls one or two of the propulsion system 120, brake system 122, and steering system 124 and a human operator controls the remainder; and nonautonomous operation means a human operator controls the propulsion system 120, brake system 122, and steering system 124.

The vehicle 100 includes the autonomous-vehicle controller 118. The autonomous-vehicle controller 118 is a microprocessor-based computing device, e.g., a generic computing device including a processor and a memory. The memory of the autonomous-vehicle controller 118 can include media for storing instructions executable by the processor as well as for electronically storing data and/or databases, and/or the autonomous-vehicle controller 118 can include structures such as the foregoing by which programming is provided.

The vehicle 100 includes a backup autonomous-vehicle controller 128. The backup autonomous-vehicle controller 128 is a microprocessor-based computing device, e.g., a generic computing device including a processor and a memory. The memory of the backup autonomous-vehicle controller 128 can include media for storing instructions executable by the processor as well as for electronically storing data and/or databases, and/or the backup autonomous-vehicle controller 128 can include structures such as the foregoing by which programming is provided. The backup autonomous-vehicle controller 128 includes the same programming as the autonomous-vehicle controller 118 for autonomously and/or semi-autonomously operating the vehicle 100.

The vehicle 100 includes a plurality of control modules 130. Each control module 130 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. Each control module 130 can thus include a processor, a memory, etc. The memory of the control module 130 can include media for storing instructions executable by the processor as well as for electronically storing data and/or databases, and/or the control module 130 can include structures such as the foregoing by which programming is provided.

For example, the control modules 130 can include a hybrid-powertrain control module, a battery-energy control module, a body control module, an antilock-brake control module, a first power-steering control module, a second power-steering control module, a collision-mitigation-system control module, an autonomous-vehicle platform-interface control module, an engine control module, an object-detection maintenance control module, a restraint control module, an accessory control module, etc.

The autonomous-vehicle controller 118, backup autonomous-vehicle controller 128, and the other control modules 130 may transmit and receive data through a communications network 132 such as a controller area network (CAN) bus, Ethernet, WiFi, Local Interconnect Network (LIN), onboard diagnostics connector (OBD-II), and/or by any other wired or wireless communications network. The autonomous-vehicle controller 118, backup autonomous-vehicle controller 128, and the other control modules 130 may be communicatively coupled to the sensors 126, the propulsion system 120, the brake system 122, the steering system 124, and other components via the communications network 132.

The sensors 126 may provide data about operation of the vehicle 100, for example, wheel speed, wheel orientation, and engine and transmission data (e.g., temperature, fuel consumption, etc.). The sensors 126 may detect the location and/or orientation of the vehicle 100. For example, the sensors 126 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 126 may detect the external world, e.g., objects and/or characteristics of surroundings of the vehicle 100, such as other vehicles, road lane markings, traffic lights and/or signs, pedestrians, etc. For example, the sensors 126 may include radar sensors, ultrasonic sensors, scanning laser range finders, light detection and ranging (lidar) devices, and image processing sensors such as cameras.

Figure 2:
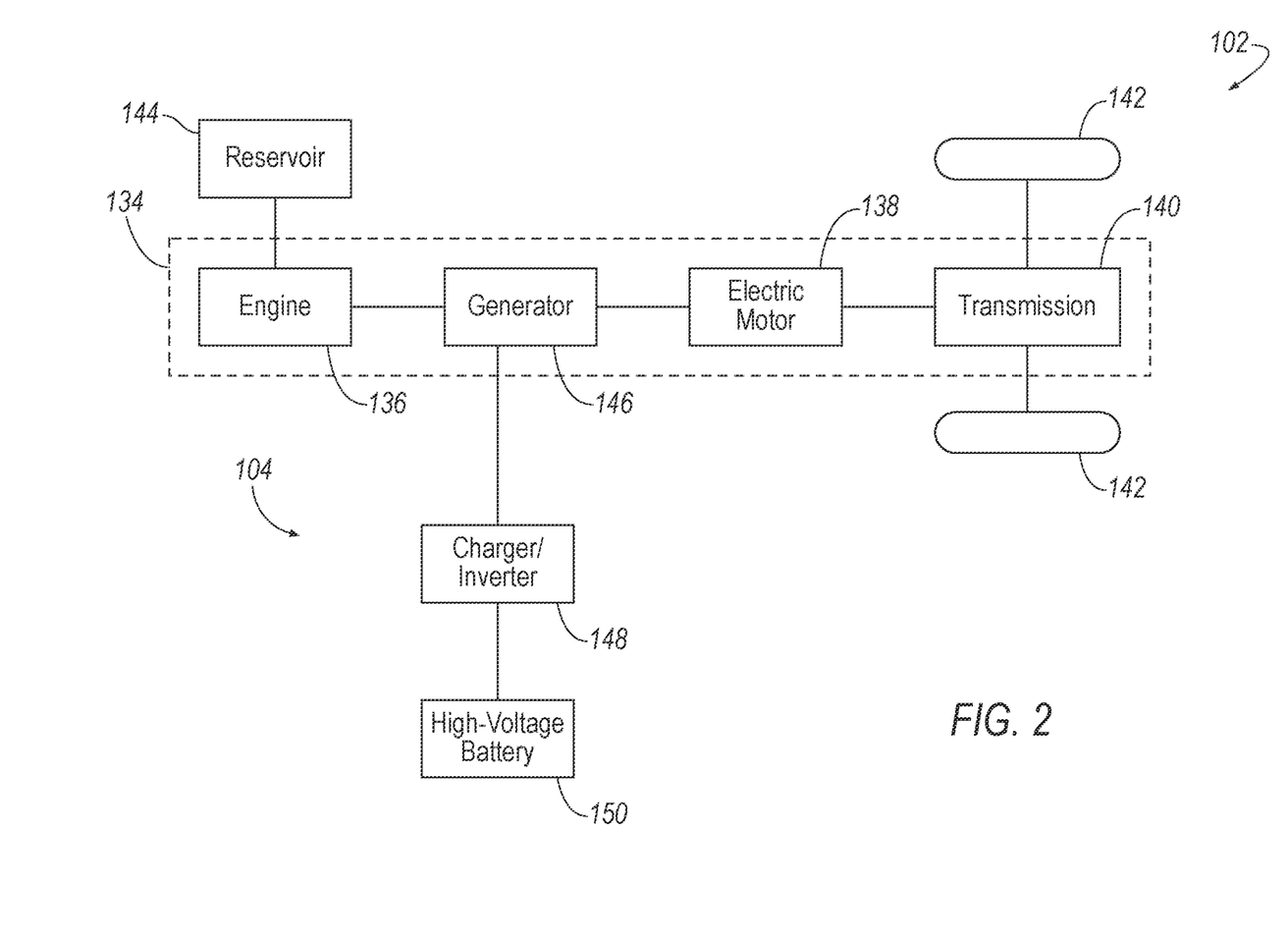
FIG. 2 is a block diagram of an example propulsion system of the vehicle.

The propulsion system 120, which can be included in the vehicle electrical system 102, generates energy and translates the energy into motion of the vehicle 100. As shown in FIG. 2, the propulsion system 120 may be hybrid propulsion. The propulsion system 120 may include a powertrain 134 in any hybrid arrangement, e.g., a series-hybrid powertrain (as shown in FIG. 2), a parallel-hybrid powertrain, a power-split (series-parallel) hybrid powertrain, etc. The propulsion system 120 is described in more detail below with respect to FIG. 2. Alternatively, the propulsion system 120 can be a plug-in hybrid propulsion or a battery electric propulsion. The propulsion system 120 can include a control module 130, e.g., the hybrid-powertrain control module, that is in communication with and receives input from the autonomous-vehicle controller 118 and/or a human driver. The human driver may control the propulsion system 120 via, e.g., an accelerator pedal and/or a gear-shift lever.

The brake system 122 is typically a conventional vehicle braking subsystem and resists the motion of the vehicle 100 to thereby slow and/or stop the vehicle 100. The brake system 122 may include friction brakes such as disc brakes, drum brakes, band brakes, etc.; regenerative brakes; any other suitable type of brakes; or a combination. The brake system 122 can include a control module 130, e.g., the antilock-brake control module, that is in communication with and receives input from the computer and/or a human operator. The human operator may control the brake system 122 via, e.g., a brake pedal.

The steering system 124 is typically a conventional vehicle steering subsystem and controls the turning of the wheels 142. The steering system 124 may be a rack-and-pinion system with electric power-assisted steering, a steer-by-wire system, as both are known, or any other suitable system. The steering system 124 can include a control module 130, e.g., the first power-steering control module, that is in communication with and receives input from the computer and/or a human operator. The human operator may control the steering system 124 via, e.g., a steering wheel.

With reference to FIG. 2, the propulsion system 120 includes the powertrain 134 that transmits power from the power source 104 such as an engine 136 and/or a high-voltage battery 150 through an electric motor 138 to a transmission 140 and ultimately to the wheels 142 of the vehicle 100. The engine 136 is an internal-combustion engine and may contain cylinders that serve as combustion chambers that convert fuel from a reservoir 144 to rotational kinetic energy. A generator 146 may receive the rotational kinetic energy from the engine 136. The generator 146 converts the rotational kinetic energy into electricity, e.g., alternating current, and powers the electric motor 138. A charger/inverter 148 may convert the output of the generator 146, e.g., the alternating current, into high-voltage direct current to supply the high-voltage battery 150 and the rest of the vehicle electrical system 102. For the purposes of this disclosure, "high voltage" is defined as at least 60 volts direct current or at least 30 volts alternating current. For example, the high-voltage direct current may be on the order of 400 volts. The charger/inverter 148 controls how much power is supplied from the high-voltage battery 150 to the generator 146 of the powertrain 134. The electric motor 138 may convert the electricity from the generator 146 into rotational kinetic energy transmitted to the transmission 140. The transmission 140 transmits the kinetic energy via, e.g., a drive axle to the wheels 142, while applying a gear ratio allowing different tradeoffs between torque and rotational speed.

The power source 104 can be or include the high-voltage battery 150. The high-voltage battery 150 produces a voltage of at least 60 volts direct current, e.g., on the order of 300 volts direct current. The high-voltage battery 150 may be any type suitable for providing high-voltage electricity for operating the vehicle 100, e.g., lithium-ion, nickel-metal hydride, lead-acid, etc. The high-voltage battery 150 is electrically coupled to the powertrain 134 via the charger/inverter 148.

With reference to FIG. 3, the vehicle electrical system 102 may include a plurality of DC/DC converters, e.g., a first DC/DC converter 152, a second DC/DC converter 154, and a third DC/DC converter 156. As shown in the example hybrid of FIG. 2, the DC/DC converters 152, 154, 156 are electrically coupled to the powertrain 134 via the charger/inverter 148 (as shown in FIG. 2) and to the power-distribution boxes 108, 114, 158. The DC/DC converters 152, 154, 156 may receive high-voltage direct current from the high-voltage battery 150 and/or from the engine 136 or electric motor 138 and convert the high-voltage direct current to low-voltage direct current; in general, for the hybrid arrangement as shown in FIG. 2 and for other arrangements of the propulsion system 120, the DC/DC converters 152, 154, 156 convert high-voltage current from a high-voltage bus to low-voltage current for the low-voltage buses 106, 112, 160. For the purposes of this disclosure, "low voltage" is defined as less than 60 volts direct current or less than 30 volts alternating current. For example, the low-voltage direct current may be 12 volts or 48 volts. Each DC/DC converter 152, 154, 156 electrically connects the high-voltage battery 150 and the respective power distribution box 108, 114, 158, e.g., the first DC/DC converter 152 electrically connects the high-voltage battery 150 and the first power-distribution box 108, the second DC/DC converter 154 electrically connects the high-voltage battery 150 and the second power-distribution box 114, and the third DC/DC converter 156 electrically connects the high-voltage battery 150 and a third power-distribution box 158 for a third low-voltage bus 160. Each DC/DC converter 152, 154, 156 may exchange the low-voltage direct current with one of the low-voltage batteries 110, 116, 166, and each DC/DC converter 152, 154, 156 may supply the low-voltage direct current to one of a plurality of the low-voltage buses 106, 112, 160.

A plurality of power-distribution boxes 108, 114, 158 include the first power-distribution box 108, the second power-distribution box 114, and the third power-distribution box 158. The power-distribution boxes 108, 114, 158 are electrically connected to the power source 104, e.g., via the respective DC/DC converter 152, 154, 156 and the charger/inverter 148. The power-distribution boxes 108, 114, 158 are electrically connected to the respective low-voltage buses 106, 112, 160 and positioned to control electrical flow from the power source 104 to the respective low-voltage bus 106, 112, 160. For example, the power-distribution boxes 108, 114, 158 divide electricity into subsidiary circuits, i.e., a plurality of loads 162 on the respective low-voltage bus 106, 112, 160. The power-distribution boxes 108, 114, 158 can each include one or more fuses (not shown), e.g., one per load 162.

The power-distribution boxes 108, 114, 158 can each include a microprocessor-based computing device, e.g., a generic computing device including a processor and a memory, an electronic controller or the like, a field-programmable gate array (FPGA), an application-specific integrated circuit (ASIC), a combination of the foregoing, etc. The power-distribution boxes 108, 114, 158 can be programmed to distribute the electrical flow to the loads 162.

Each low-voltage battery 110, 116, 166 can be electrically connected to the respective power-distribution box 108, 114, 158 and arranged to supply electricity to the respective low-voltage bus 106, 112, 160 via the respective power-distribution box 108, 114, 158. Each low-voltage battery 110, 116, 166 produces a voltage less than 60 volts direct current, e.g., 12 or 48 volts direct current. The low-voltage batteries 110, 116, 166 may be any type suitable for providing low-voltage electricity to power the loads 162, e.g., lithium-ion, lead-acid, etc. For example, the third low-voltage battery 166 electrically coupled to the third power-distribution box 158 can be a lead-acid battery, and the first and second low-voltage batteries 110, 116 electrically coupled to the first and second power-distribution boxes 108, 114 can be lithium-ion batteries. The low-voltage batteries 110, 116, 166 can be electrically coupled to the powertrain 134 via the respective power-distribution box 108, 114, 158, the respective DC/DC converter 152, 154, 156, and the charger/inverter 148.

The vehicle electrical system 102 includes a plurality of the low-voltage buses 106, 112, 160, e.g., the first low-voltage bus 106, the second low-voltage bus 112, and the third low-voltage bus 160. The low-voltage buses 106, 112, 160 transmit the electricity distributed by the respective power-distribution box 108, 114, 158 to the loads 162 connected to the low-voltage buses 106, 112, 160.

The loads 162 are components of the vehicle 100 that use electricity. The loads 162 may include the control modules 130, which can be categorized as autonomous control modules 130a, backup autonomous control modules 130b, motion control modules 130c, and backup motion control modules 130d. The loads 162 can also include other loads 162e, including other control modules 130, unrelated to autonomous control or motion control. For example, the autonomous control modules 130a can include the autonomous-vehicle controller 118 and processors for the sensors 126, and the backup autonomous control modules 130b can include the backup autonomous-vehicle controller 128 and backup processors for the sensors 126. The motion control modules 130c can include the hybrid-powertrain control module, the engine control module, the body control module, the antilock-brake control module, the first power-steering control module, the collision-mitigation-system control module, and the object-detection maintenance control module. The backup motion control modules 130d can include an antilock-brake-system backup and the second power-steering control module. The other loads 162e can include the accessories control module, the restraint control module, a high-voltage contactor for the battery-energy control module to control electricity flow to the DC/DC converters 152, 154, 156, etc.; a data recorder; an air-conditioning system or components or settings of the air-conditioning system such as an AC fan or a high-speed mode; a fan for cooling the engine 136; an electric water pump for the engine 136; power points (i.e., sockets in a passenger cabin for passengers to plug in personal devices), etc.

Each load 162 is electrically connected to one of the low-voltage buses 106, 112, 160 and arranged to receive electricity from that low-voltage bus 106, 112, 160. Each low-voltage bus 106, 112, 160 can include at least one of the control modules 130. For example, the autonomous control modules 130a can be connected to the second low-voltage bus 112, and the backup autonomous control modules 130b can be connected to the first low-voltage bus 106. The motion control modules 130c can be connected to the first low-voltage bus 106, and the backup motion control modules 130d can be connected to the second low-voltage bus 112. Thus, even if one of the first and second low-voltage buses 106, 112 experiences a fault, the loads 162 on the other can provide for operating the vehicle 100. The other loads 162e can be connected to the third low-voltage bus 160. Thus, the vehicle 100 can still operate if a fault occurs on the third low-voltage bus 160.

The vehicle 100 includes a gateway module 164. The gateway module 164 is a control module 130 that connects and transmits data between buses of different domains in the vehicle 100, e.g., the CAN bus, Ethernet, LIN, OBD-II, etc., which can have different baud rates. The first power-distribution box 108 can be communicatively coupled to the second power-distribution box 114 via the gateway module 164 and can be isolated from the second power-distribution box 114 other than via the gateway module 164 (and vice versa).

In normal operation, the loads 162 are typically powered via the DC/DC converters 152, 154, 156 without drawing power from the low-voltage batteries 110, 116, 166. The low-voltage batteries 110, 116, 166 supply power in the event of transient demands from the loads 162 for greater power than the DC/DC converters 152, 154, 156 can supply. The power source 104 is electrically connected to the loads 162 via the DC/DC converters 152, 154, 156. The power source 104 and the low-voltage batteries 110, 116, 166 are separate components.

The low-voltage batteries 110, 116, 166 each have a state of charge that can vary between 0% (no remaining charge) and 100% (fully charged). The state of charge can be measured by various battery sensors (not shown) monitoring the low-voltage batteries 110, 116, 166 in communication with the respective power-distribution box 108, 114, 158. For example, the battery sensors can infer the state of charge from the current flowing through the low-voltage battery 110, 116, 166 and from the temperature of the low-voltage battery 110, 116, 166 using known relationships. The state of charge can alternatively be measured in units of electrical charge, e.g., ampere-hours. The state of charge as a percentage is equal to the state of charge in units of charge divided by a capacity of the low-voltage battery 110, 116, 166. The capacity of a battery is a maximum quantity of charge that the battery can store.

The first and second power-distribution boxes 108, 114 can be programmed to perform tests on the respective low-voltage batteries 110, 116, i.e., the first power-distribution box 108 can be programmed to perform the first test on the first low-voltage battery 110, and the second power-distribution box 114 can be programmed to perform the second test on the second low-voltage battery 116. For example, the tests can be discharge tests. The first or second power-distribution box 108, 114 can reduce the voltage supplied by the power source 104 to the loads 162 on the respective low-voltage bus 106, 112, causing the respective low-voltage battery 110, 116 to discharge to supply power to the loads 162. In particular, the first or second power-distribution box 108, 114 can reduce the voltage supplied by the respective DC/DC converter 152, 154 to the respective power-distribution box 108, 114 so that the low-voltage battery 110, 116 discharges to supply power to the loads 162 connected to that low-voltage bus 106, 112. The amount and duration of the voltage reduction are chosen so that the resulting discharge brings the state of charge below a state-of-charge (SoC) threshold. The SoC threshold is chosen to be below a state of charge after typical discharges of the low-voltage battery 110, 116 during normal operation of the vehicle 100, which can be determined experimentally, but sufficiently large that the low-voltage battery 110, 116 has sufficient remaining charge for a minimal risk maneuver plus a buffer charge, i.e., sufficiently large that the vehicle 100 can perform the minimal risk maneuver, e.g., the capacity minus 0.5 ampere-hours. The amount and duration of the voltage reduction are chosen so that the resulting discharge is greater than a charge necessary to perform the minimal risk maneuver (MRM discharge); e.g., the discharge is equal to a sum of a buffer charge, the MRM discharge, and the battery capacity minus the SoC threshold. The buffer charge can be chosen to compensate for changes to the charge to perform the minimal risk maneuver that can occur due to temperature, aging of the low-voltage battery 110, 116, etc. For example, the voltage reduction can result in a discharge that is a 200 ampere discharge of the low-voltage battery for 45 seconds, i.e., 2.5 ampere-hours.

The first and second power-distribution boxes 108, 114 can be programmed to perform tests on the respective low-voltage batteries 110, 116 at specific times. For example, the first and second power-distribution boxes 108, 114 can be programmed to perform the tests in response to the vehicle 100 starting. In response to the vehicle 100 starting, the first and second power-distribution boxes 108, 114 can perform the first and second tests such that the second test overlaps the first test. The tests can be performed while the vehicle 100 is not movably operating, e.g., immediately after the vehicle 100 starts and before the vehicle 100 is put into gear. Overlapping the tests can permit both tests to be performed before the operator begins operating the vehicle 100. The first and second power-distribution boxes 108, 114 can overlap the tests by performing a handshake via the gateway module 164.

For another example, the first power-distribution box 108 can be programmed to perform the first test while the vehicle 100 is movably operating, and the second power-distribution box 114 can be programmed to perform the second test while the vehicle 100 is movably operating. The second power-distribution box 114 can perform the second test without overlapping the first test; i.e., the first and second tests can be spaced in time from each other. The first power-distribution box 108 can perform the first test at a preset interval after the second test (or after the vehicle 100 starting if the second test has not been performed yet since starting the vehicle 100), e.g., fifteen minutes. The second power-distribution box 114 can perform the second test at a preset interval after the first test, e.g., fifteen minutes. Thus, the first test is performed every thirty minutes, and the second test is performed every thirty minutes. Spacing the tests can permit can reduce stress on the vehicle electrical system 102. The first and second power-distribution boxes 108, 114 can space the tests by performing a handshake via the gateway module 164.

The tests are isolated from the other low-voltage buses 106, 112, 160 and from the low-voltage batteries and loads 162 on the other low-voltage buses. The first test is isolated from the second low-voltage bus 112 and third low-voltage bus 160 and from the second low-voltage battery 116 and the third low-voltage battery 166. The second test is isolated from the first low-voltage bus 106 and the third low-voltage bus 160 and from the first low-voltage battery 110 and the third low-voltage battery 166. For the purposes of this disclosure, a test being isolated from a component means that the test does not cause a change in electrical quantities experienced by the component. For example, if the tests are discharge tests, the tests do not cause any of the low-voltage batteries 110, 116, 166 to supply the other low-voltage buses 106, 112, 160, and the other low-voltage buses 106, 112, 160 do not experience a change in any electrical quantities.

The power-distribution boxes 108, 114 can be programmed to track one or more electrical quantities during the respective tests. The electrical quantities can include a voltage of the respective power-distribution box 108, 114, voltages of individual loads 162 on the respective low-voltage bus 106, 112, and/or the voltage of the respective low-voltage battery 110, 116.

The power-distribution boxes 108, 114 can be programmed to determine whether any of the electrical quantities are outside a respective electrical-quantity range while performing the tests. The electrical-quantity ranges are chosen to correspond to the respective electrical quantities when operating normally, i.e., chosen so that when a fault has occurred in the vehicle electrical system 102, e.g., a partial or complete electrical short, during the test, the respective electrical quantities will be outside the electrical-quantity ranges. Each electrical-quantity range includes an upper bound, a lower bound, or both an upper bound and a lower bound. An electrical quantity is outside the respective electrical-quantity range by being greater than the upper bound or less than the lower bound. The electrical-quantity ranges are stored in the memory of the respective power-distribution boxes 108, 114.

The power-distribution boxes 108, 114 can be programmed to, in response to an electrical quantity being inside the respective electrical-quantity range while performing the respective test, permit the vehicle 100 to operate normally, e.g., permit the propulsion system 120, the brake system 122, and the steering system 124 to operate.

The power-distribution boxes 108, 114 can be programmed to, in response to an electrical quantity being outside the respective electrical-quantity range while performing the respective test, transmit an instruction to perform a minimal risk maneuver or prevent the vehicle 100 from movably operating. For example, the respective power-distribution box 108, 114 can transmit the instruction via the gateway module 164 to the autonomous-vehicle controller 118 or the backup autonomous-vehicle controller 128. For example, the first power-distribution box 108 can, in response to an electrical quantity being outside the respective electrical-quantity range while performing the first test, transmit the instruction via the gateway module 164 to the autonomous-vehicle controller 118, and the second power-distribution box 114 can, in response to an electrical quantity being outside the respective electrical-quantity range while performing the second test, transmit the instruction via the gateway module 164 to the backup autonomous-vehicle controller 128.

The instruction can be to perform the minimal risk maneuver. For the purposes of this disclosure, a "minimal risk maneuver" is a set of operations of the vehicle 100 to put the vehicle 100 in a minimal risk condition, and a "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human operator fails to respond appropriately to a request to take over the dynamic driving task." (U.S. Dept. of Transportation & NHTSA, Automated Driving Systems 2.0: A Vision for Safety, at 26 (citing SAE International J3016, International Taxonomy and Definitions for Terms Related to Driving Automation Systems for On-Road Motor Vehicles (J3016: September 2016)).) For example, the minimal risk maneuver may be initiating a handover to the human operator or autonomously driving the vehicle 100 to a halt at a roadside, i.e., stopping the vehicle 100 outside active lanes of traffic. The autonomous-vehicle controller 118 or backup autonomous-vehicle controller 128 may perform the minimal risk maneuver by using known autonomous-operation algorithms.

The instruction can be to prevent the vehicle 100 from movably operating. For example, the autonomous-vehicle controller 118 or backup autonomous-vehicle controller 128 can prevent the propulsion system 120 and steering system 124 from actuating or can instruct the propulsion system 120 to keep the vehicle 100 in park. For another example, if the vehicle 100 is moving, the autonomous-vehicle controller 118 or backup autonomous-vehicle controller 128 can instruct the brake system 122 to stop the vehicle 100 and can prevent the propulsion system 120 and steering system 124 from actuating. The instruction can be to perform the minimal risk maneuver if the vehicle 100 is autonomously operating and movably operating, and the instruction can be to prevent the vehicle 100 from movably operating if the vehicle 100 is not autonomously operating or if the vehicle 100 is stationary.

Figure 4:
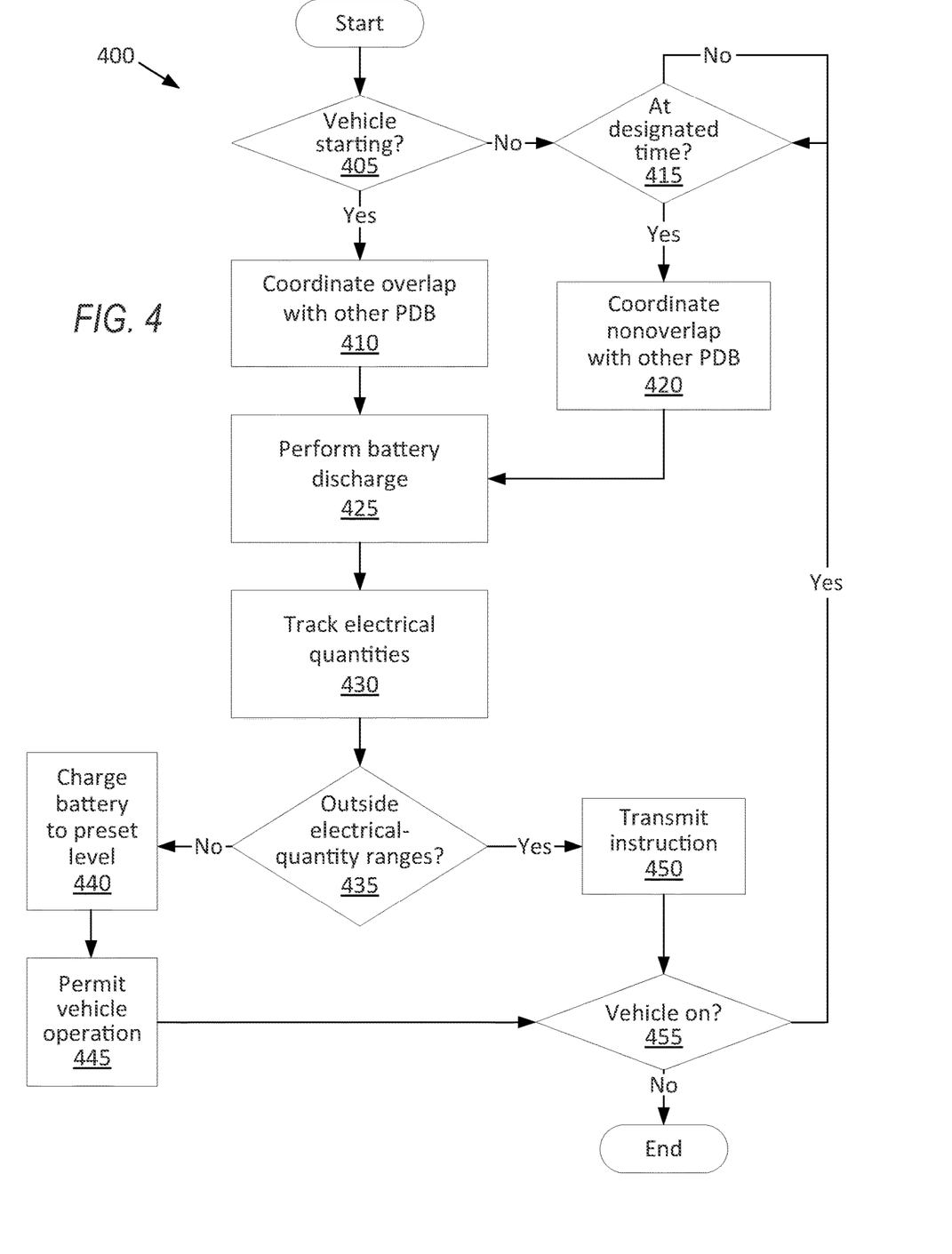
FIG. 4 is a process flow diagram of an example process for a power-distribution box to perform a test on a battery of the electrical system.

FIG. 4 is a process flow diagram illustrating an exemplary process 400 for one of the power-distribution boxes 108, 114 to perform the respective test, e.g., for the first power-distribution box 108 to perform the first test or for the second power-distribution box 114 to perform the second test. The memory of the respective power-distribution box 108, 114 stores executable instructions for performing the steps of the process 400 and/or programming can be implemented in structures such as mentioned above. As a general overview of the process 400, the respective power-distribution box 108, 114 can, in response to the vehicle 100 starting, coordinate an overlap of the test with the other power-distribution box 108, 114. At a designated time, the respective power-distribution box 108, 114 can coordinate that the test will not overlap with the test by the other power-distribution box 108, 114. In either case, the respective power-distribution box 108, 114 causes the discharge by the respective low-voltage battery 110, 116 and tracks the electrical quantities. In response to the electrical quantities being inside the electrical-quantity ranges, the respective power-distribution box 108, 114 charges the respective low-voltage battery 110, 116 to a preset voltage and permits the vehicle 100 to movably operate. In response to at least one of the electrical quantities being outside the electrical-quantity range, the respective power-distribution box 108, 114 transmits the instruction to perform the minimal risk maneuver or prevent the vehicle 100 from movably operating. The process 400 continues for as long as the vehicle 100 remains on.

The process 400 begins in a decision block 405, in which the respective power-distribution box 108, 114 determines whether the vehicle 100 has just started. For example, the power-distribution box 108, 114 can determine that it just received a wake-up message via the gateway module 164. In response to the vehicle 100 starting, the process 400 proceeds to a block 410. If the vehicle 100 has not just started, the process 400 proceeds to a decision block 415.

In the block 410, the respective power-distribution box 108, 114 schedules the respective test so that the test overlaps with the test performed by the other power-distribution box 108, 114, as described above. In other words, the first power-distribution box 108 schedules the first test so that the first test overlaps with the second test, and the second power-distribution box 114 schedules the second test so that the second test overlaps with the first test. For example, the first and second power-distribution boxes 108, 114 can perform a handshake to coordinate beginning the tests. After the block 410, the process 400 proceeds to a block 425.

In the decision block 415, the respective power-distribution box 108, 114 determines the preset time has elapsed since the last test, e.g., fifteen minutes, as described above. If so, the process 400 proceeds to a block 420. If not, the respective power-distribution box continues checking the elapsed time until the preset time is reached.

In the block 420, the respective power-distribution box 108, 114 schedules the respective test so that the test occurs while the vehicle 100 is movably operating and does not overlap with the test performed by the other power-distribution box 108, 114, as described above. In other words, the first power-distribution box 108 schedules the first test so that the first test does not overlap with the second test, and the second power-distribution box 114 schedules the second test so that the second test does not overlap with the first test. For example, the first and second power-distribution boxes 108, 114 can perform a handshake to coordinate beginning the tests. After the block 420, the process 400 proceeds to a block 425.

In the block 425, the respective power-distribution box 108, 114 performs the test by causing the respective low-voltage battery 110, 116 to discharge to supply electricity to the loads 162 on the respective low-voltage bus 106, 112, as described above.

Next, in a block 430, the respective power-distribution box 108, 114 tracks the electrical quantities, as described above.

Next, in a decision block 435, the respective power-distribution box 108, 114 determines whether any of the electrical quantities are outside the respective electrical-quantity ranges, as described above. In response to all the electrical quantities being inside their respective electrical-quantity ranges, the process 400 proceeds to a block 440. In response to an electrical quantity being outside the respective electrical-quantity range, the process 400 proceeds to a block 450.

In the block 440, the respective power-distribution box 108, 114 instructs the respective DC/DC converter 152, 154 to charge the respective low-voltage battery 110, 116 to a preset level. The preset level can be chosen so that the state of charge of the low-voltage battery 110, 116 is above the charge threshold. The preset level can be a state of charge that the low-voltage battery 110, 116 is charged to during normal operation, e.g., approximately 100%.

Next, in a block 445, the respective power-distribution box 108, 114 permits the vehicle 100 to be movably operated, as described above. After the block 445, the process 400 proceeds to a decision block 455.

In the block 450, the respective power-distribution box 108, 114 transmits the instruction to perform the minimal risk maneuver or prevent the vehicle 100 from movably operating, as described above. After the block 450, the process 400 proceeds to the decision block 455.

In the decision block 455, the respective power-distribution box 108, 114 determines whether the vehicle 100 is still on. For example, the power-distribution box 108, 114 can determine whether it has received a shutdown message. If the vehicle 100 is still on, the process 400 returns to the decision block 415 to determine whether to perform another test. If the vehicle 100 has been turned off, the process 400 ends.

Figure 5:
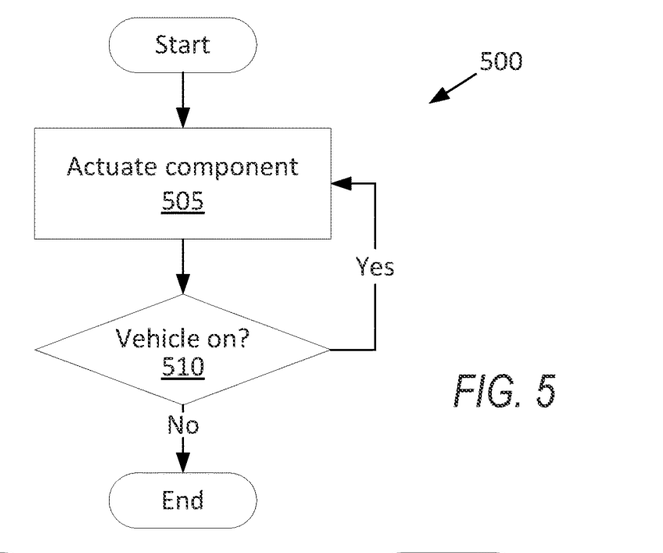
FIG. 5 is a process flow diagram of an example process for a control module to actuate a component of the vehicle.

FIG. 5 is a process flow diagram illustrating an exemplary process 500 for actuating a component of the vehicle 100. The memory of one or more of the autonomous control modules 130a and/or motion control modules 130c store executable instructions for performing the steps of the process 500 and/or programming can be implemented in structures such as mentioned above. As a general overview of the process 500, the control module 130a,c instructs the component to actuate. The process 500 continues for as long as the vehicle 100 remains on.

The process 500 begins in a block 505, in which the control module 130a,c instructs a component of the vehicle 100 to actuate. For example, one of the autonomous control modules 130a, e.g., the autonomous-vehicle controller 118, can instruct the propulsion system 120, brake system 122, and steering system 124 to autonomously operate the vehicle 100 according to known autonomous-operation algorithms. For another example, one of the motion control modules 130c can instruct one or more of the propulsion system 120, brake system 122, or steering system 124 to actuate. One or more of the hybrid-powertrain control module, the antilock-brake control module, the collision-mitigation-system control module, and the object-detection maintenance control module can actuate the propulsion system 120 and/or the brake system 122 according to known algorithms for adaptive cruise control (ACC). The first power-steering control module can actuate the steering system 124 according to known algorithms for lane-keeping assist (LKA). One or more of the antilock-brake control module, the collision-mitigation-system control module, and the object-detection maintenance control module can instruct the brake system 122 to actuate according to known algorithms for automatic emergency braking (AEB).

Next, in a decision block 510, the control module 130a,c determines whether the vehicle 100 is still on. If so, the process 500 returns to the block 505 to continue actuating the component. If not, the process 500 ends.

Figure 6:
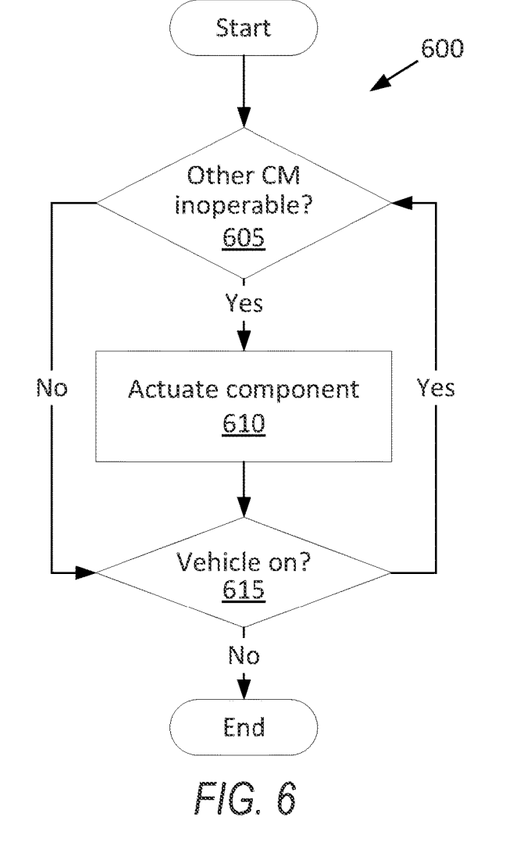
FIG. 6 is a process flow diagram of an example process for another control module to actuate the component of the vehicle.

FIG. 6 is a process flow diagram illustrating an exemplary process 600 for actuating a component of the vehicle 100 by a backup control module 130b,d. The memory of the backup control module 130b,d stores executable instructions for performing the steps of the process 600 and/or programming can be implemented in structures such as mentioned above. As a general overview of the process 600, the backup control module 130b,d determines whether the corresponding nonbackup control module 130a,c is inoperable. If so, the backup control module 130b,d instructs the component to actuate. The process 600 continues for as long as the vehicle 100 remains on.

The process 600 begins in a decision block 605, in which the backup control module 130b,d determines whether the corresponding nonbackup control module 130a,c is inoperable. For example, the backup autonomous-vehicle controller 128 can determine whether the autonomous-vehicle controller 118 is inoperable, the antilock-brake-system backup can determine whether the antilock-brake control module is inoperable, the second power-steering control module can determine whether the first power-steering control module is inoperable, etc. The backup control module 130b,d can determine whether the corresponding nonbackup control module 130a,c is inoperable based on whether the backup control module 130b,d has received a message indicating so. If the nonbackup control module 130a,c is inoperable, the process 600 proceeds to a block 610. If the nonbackup control module 130a,c is still operable, the process 600 proceeds to a decision block 615.

In the block 610, the backup control module 130b,d instructs a component of the vehicle 100 to actuate. For example, one of the backup autonomous control modules 130b, e.g., the backup autonomous-vehicle controller 128, can instruct the propulsion system 120, brake system 122, and steering system 124 to autonomously operate the vehicle 100 according to known autonomous-operation algorithms. For another example, one of the backup motion control modules 130d can instruct one or more of the propulsion system 120, brake system 122, or steering system 124 to actuate. The second power-steering control module can actuate the steering system 124 according to known algorithms for lane-keeping assist (LKA). The antilock-brake-system backup can instruct the brake system 122 to actuate according to known algorithms for automatic emergency braking (AEB). After the block 610, the process 600 proceeds to the decision block 615.

In the decision block 615, the backup control module 130b,d determines whether the vehicle 100 is still on. If so, the process 600 returns to the decision block 605 to continue monitoring the corresponding nonbackup control module 130a,c. If not, the process 600 ends.

Figure 7:
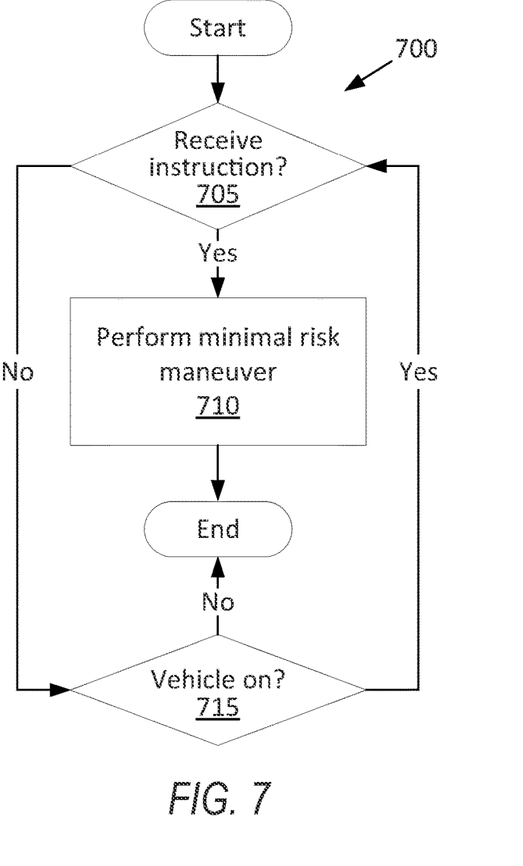
FIG. 7 is a process flow diagram of an example process for a control module to perform a minimal risk maneuver.

FIG. 7 is a process flow diagram illustrating an exemplary process 700 for performing a minimal risk maneuver. The memories of the autonomous-vehicle controller 118 and the backup autonomous-vehicle controller 128 store executable instructions for performing the steps of the process 700 and/or programming can be implemented in structures such as mentioned above. As a general overview of the process 700, the autonomous-vehicle controller 118 or backup autonomous-vehicle controller 128 determines whether it has received the instruction to perform the minimal risk maneuver. If so, the autonomous-vehicle controller 118 or backup autonomous-vehicle controller 128 performs the minimal risk maneuver. If not, the autonomous-vehicle controller 118 or backup autonomous-vehicle controller 128 continues to check for the instruction as long as the vehicle 100 remains on.

The process 700 begins in a decision block 705, in which the autonomous-vehicle controller 118 or backup autonomous-vehicle controller 128 determines whether it has received the instruction from one of the power-distribution boxes 108, 114, as described above with respect to the block 450 of the process 400. Upon receiving the instruction, the process 700 proceeds to a block 710. If the autonomous-vehicle controller 118 or backup autonomous-vehicle controller 128 has not received the instruction, the process 700 proceeds to a decision block 715.

In the block 710, the autonomous-vehicle controller 118 or backup autonomous-vehicle controller 128 performs the minimal risk maneuver, as described above. After the block 710, the process 700 ends.

In the decision block 715, the autonomous-vehicle controller 118 or backup autonomous-vehicle controller 128 determines whether the vehicle 100 is still on. If so, the process 700 returns to the decision block 705 to continue monitoring for the instruction. If not, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle electrical system for a vehicle comprising:
a power source;
a first low-voltage bus;
a first power-distribution box electrically connected to the power source and to the first low-voltage bus and positioned to control electrical flow from the power source to the first low-voltage bus;
a first low-voltage battery electrically connected to the first power-distribution box and arranged to supply electricity to the first low-voltage bus via the first power-distribution box;
a second low-voltage bus;
a second power-distribution box electrically connected to the power source and to the second low-voltage bus and positioned to control electrical flow from the power source to the second low-voltage bus; and
a second low-voltage battery electrically connected to the second power-distribution box and arranged to supply electricity to the second low-voltage bus via the second power-distribution box;
wherein the first power-distribution box is programmed to perform a first test on the first low-voltage battery, the first test being isolated from the second low-voltage battery; and
the second power-distribution box is programmed to perform a second test on the second low-voltage battery, the second test being isolated from the first low-voltage battery.

2. The vehicle electrical system of claim 1, further comprising a gateway module, wherein the first power-distribution box is communicatively coupled to the second power-distribution box via the gateway module.

3. The vehicle electrical system of claim 1, wherein the power source is a high-voltage battery.

4. The vehicle electrical system of claim 3, further comprising:
a first DC/DC converter electrically connecting the high-voltage battery and the first power-distribution box; and
a second DC/DC converter electrically connecting the high-voltage battery and the second power-distribution box.

5. The vehicle electrical system of claim 1, further comprising:
a first control module electrically connected to the first low-voltage bus and arranged to receive electricity from the first low-voltage bus; and
a second control module electrically connected to the second low-voltage bus and arranged to receive electricity from the second low-voltage bus;
wherein the first control module is programmed to instruct a component of the vehicle to actuate, and the second control module is programmed to, in response to the first control module being inoperable, instruct the component to actuate.

6. The vehicle electrical system of claim 5, wherein the component includes at least one of a steering system and a brake system.

7. The vehicle electrical system of claim 5, wherein actuating the component includes autonomously operating the vehicle.

8. The vehicle electrical system of claim 1, wherein the first power-distribution box is programmed to perform the first test while the vehicle is movably operating.

9. The vehicle electrical system of claim 8, wherein the second power-distribution box is programmed to perform the second test while the vehicle is movably operating and without overlapping the first test.

10. The vehicle electrical system of claim 1, wherein the first power-distribution box is programmed to perform the first test in response to the vehicle starting.

11. The vehicle electrical system of claim 10, wherein the second power-distribution box is programmed to perform the second test in response to the vehicle starting such that the second test overlaps the first test.

12. The vehicle electrical system of claim 1, wherein:
performing the first test includes causing the first low-voltage battery to discharge to supply electricity to first loads on the first low-voltage bus; and
performing the second test includes causing the second low-voltage battery to discharge to supply electricity to second loads on the second low-voltage bus.

13. The vehicle electrical system of claim 12, wherein:
a first discharge by the first low-voltage battery during the first test is greater than a charge necessary to perform a minimal risk maneuver; and
a second discharge by the second low-voltage battery during the second test is greater than the charge necessary to perform the minimal risk maneuver.

14. The vehicle electrical system of claim 1, wherein the first power-distribution box is programmed to, in response to an electrical quantity of the vehicle electrical system being outside an electrical-quantity range while performing the first test, transmit an instruction to perform a minimal risk maneuver or prevent the vehicle from movably operating.

15. The vehicle electrical system of claim 14, further comprising:
a first control module electrically connected to the first low-voltage bus and arranged to receive electricity from the first low-voltage bus; and
a second control module electrically connected to the second low-voltage bus and arranged to receive electricity from the second low-voltage bus;
wherein the second control module is programmed to, upon receiving the instruction from the first power-distribution box, perform the minimal risk maneuver.

16. The vehicle electrical system of claim 14, wherein:
the instruction is a first instruction; and
the second power-distribution box is programmed to, in response to the electrical quantity of the vehicle electrical system being outside the electrical-quantity range while performing the second test, transmit a second instruction to perform the minimal risk maneuver or prevent the vehicle from movably operating.

17. The vehicle electrical system of claim 16, further comprising:
a first control module electrically connected to the first low-voltage bus and arranged to receive electricity from the first low-voltage bus; and
a second control module electrically connected to the second low-voltage bus and arranged to receive electricity from the second low-voltage bus;

wherein the first control module is programmed to, upon receiving the second instruction from the second power-distribution box, perform the minimal risk maneuver.

18. The vehicle electrical system of claim 17, wherein the second control module is programmed to, upon receiving the instruction from the first power-distribution box, perform the minimal risk maneuver.

19. The vehicle electrical system of claim 1, further comprising:
 a third low-voltage bus;
 a third power-distribution box electrically connected to the power source and to the third low-voltage bus and positioned to control electrical flow from the power source to the third low-voltage bus; and
 a third low-voltage battery electrically connected to the third power-distribution box and arranged to supply electricity to the third low-voltage bus via the third power-distribution box;
 wherein the first test and the second test are isolated from the third low-voltage battery.

20. The vehicle electrical system of claim 19, further comprising a load electrically connected to the third low-voltage bus and arranged to receive electricity from the third low-voltage bus, wherein the load includes an accessories control module.

* * * * *